(12) United States Patent
Zhang et al.

(10) Patent No.: US 10,599,544 B2
(45) Date of Patent: Mar. 24, 2020

(54) DETERMINING REBOOT TIMES OF COMPUTING NODES

(71) Applicant: INTERNATIONAL BUSINESS MACHINES CORPORATION, Armonk, NY (US)

(72) Inventors: Qing Feng Zhang, Beijing (CN); Xue Feng Gao, Beijing (CN); Shan Gao, Beijing (CN); Peng Han, Beijing (CN); Zhen Yang Shi, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 15/820,999

(22) Filed: Nov. 22, 2017

(65) Prior Publication Data
US 2019/0155714 A1    May 23, 2019

(51) Int. Cl.
*G06F 11/34* (2006.01)
*G06F 9/4401* (2018.01)
*G06F 11/30* (2006.01)
*G06F 8/65* (2018.01)
*G06N 20/00* (2019.01)
*G06N 5/02* (2006.01)

(52) U.S. Cl.
CPC ............ *G06F 11/3433* (2013.01); *G06F 8/65* (2013.01); *G06F 9/4401* (2013.01); *G06F 11/3024* (2013.01); *G06N 5/025* (2013.01); *G06N 20/00* (2019.01)

(58) Field of Classification Search
CPC .............. G06N 5/025; G06F 8/65; G06F 9/44
See application file for complete search history.

(56) References Cited

U.S. PATENT DOCUMENTS

| 7,802,083 | B2 | 9/2010 | Gurumoorthy et al. |
| 8,381,264 | B1 | 2/2013 | Corddry et al. |
| 9,069,737 | B1 | 6/2015 | Kimotho et al. |
| 9,152,532 | B2 | 10/2015 | Breternitz et al. |
| 9,424,047 | B2 | 8/2016 | Hall et al. |
| 2008/0172553 | A1* | 7/2008 | Childress .............. G06F 9/4405 713/2 |
| 2010/0036780 | A1* | 2/2010 | Angelov .............. G06K 9/6226 706/12 |
| 2012/0102480 | A1 | 4/2012 | Hopmann et al. |
| 2013/0263104 | A1 | 10/2013 | Baset et al. |

(Continued)

*Primary Examiner* — Kim Huynh
*Assistant Examiner* — Kevin M Stewart
(74) *Attorney, Agent, or Firm* — Schmeiser, Olsen & Watts; Mark C. Vallone

(57) ABSTRACT

An approach is provided for determining whether to reboot a computing node. Data specifying user behaviors and intra-box and inter-box factors associated with computing nodes are collected and classified in groups. Rules corresponding to the groups are generated. Each rule includes an indicator of whether the corresponding group is associated with permitting or not permitting a reboot. Computing node data is received which specifies intra-box and inter-box factors of the computing node and user operations of the computing node. After determining that the computing node data matches one of the groups, it is determined that a rule corresponding to the group includes an indicator of whether the computing node is permitted to be rebooted. Based on the indicator, the computing node is rebooted or not rebooted.

20 Claims, 8 Drawing Sheets

(56) References Cited

U.S. PATENT DOCUMENTS

| | | | |
|---|---|---|---|
| 2015/0242856 A1* | 8/2015 | Dhurandhar | G06Q 50/01 |
| | | | 705/44 |
| 2017/0099592 A1* | 4/2017 | Loeb | H04L 67/303 |
| 2017/0329597 A1* | 11/2017 | Harmon | G06F 8/65 |
| 2018/0157557 A1* | 6/2018 | Puustinen | G06F 11/1438 |
| 2018/0357061 A1* | 12/2018 | Kludy | G06F 9/4881 |
| 2019/0138938 A1* | 5/2019 | Vasseur | H04L 41/145 |

\* cited by examiner

DETERMINING REBOOT TIMES OF COMPUTING NODES

BACKGROUND

The present invention relates to managing a reboot of a computing node, and more particularly to determining a reboot time of a computing node in a cloud computing environment.

As more cloud environments emerge, cloud security becomes an important issue. In the realm of cloud security, auto patching at operating system (OS) and application levels and critical changes to remediate security vulnerabilities require an OS reboot of cloud nodes. Known techniques of cloud node rebooting include a time-consuming requirement that cloud providers check with cloud virtual machine (VM) owners and receive user input before rebooting. Other known cloud node rebooting techniques include rebooting VMs without notification or pre-alert, which results in application breach or a loss of data, which eventually damages the quality of cloud services.

Factors that affect OS rebooting of cloud nodes are significant and complicated. These factors include determining whether a user is active or inactive, whether an application, file, or process is active or inactive, whether there is live connectivity to target machines. A determination must be made whether these factors are equally important or whether one or more factors are more important than other factor(s) when making a decision to reboot an OS of a cloud node.

SUMMARY

In one embodiment, the present invention provides a method of determining a reboot time of a computing node in a network of computing nodes. The method includes a computer collecting data specifying intra-box factors, inter-box factors, and user behaviors associated with the computing nodes in the network. The method further includes the computer classifying the collected data in groups of metrics. The method further includes based on the classified data and user feedback, the computer generating rules corresponding to the groups. Each rule includes an indicator of whether the corresponding group is associated with permitting a reboot or not permitting the reboot. The method further includes the computer receiving data associated with the computing node in the network. The received data includes: data specifying intra-box factors and inter-box factors of the computing node and user behaviors that include operations of the computing node initiated by a user. The method further includes the computer determining that the data associated with the computing node matches a group included in the groups of metrics. The method further includes based on the data associated with the computing node matching the group, the computer determining that a rule corresponding to the group includes an indicator that indicates whether the computing node is permitted to be rebooted. The method further includes if the indicator in the rule indicates that the computing node is permitted to be rebooted, the computer automatically rebooting the computing node, or if the indicator in the rule indicates that the computing node is not permitted to be rebooted, the computer making a decision to not reboot the computing node and requesting user feedback about the decision to not reboot the computing node.

In another embodiment, the present invention provides a computer program product for determining a reboot time of a computing node in a network of computing nodes. The computer program product includes a computer readable storage medium. Computer readable program code is stored in the computer readable storage medium. The computer readable storage medium is not a transitory signal per se. The computer readable program code is executed by a central processing unit (CPU) of a computer system to cause the computer system to perform a method. The method includes the computer system collecting data specifying intra-box factors, inter-box factors, and user behaviors associated with the computing nodes in the network. The method further includes the computer system classifying the collected data in groups of metrics. The method further includes based on the classified data and user feedback, the computer system generating rules corresponding to the groups. Each rule includes an indicator of whether the corresponding group is associated with permitting a reboot or not permitting the reboot. The method further includes the computer system receiving data associated with the computing node in the network. The received data includes: data specifying intra-box factors and inter-box factors of the computing node and user behaviors that include operations of the computing node initiated by a user. The method further includes the computer system determining that the data associated with the computing node matches a group included in the groups of metrics. The method further includes based on the data associated with the computing node matching the group, the computer system determining that a rule corresponding to the group includes an indicator that indicates whether the computing node is permitted to be rebooted. The method further includes if the indicator in the rule indicates that the computing node is permitted to be rebooted, the computer system automatically rebooting the computing node, or if the indicator in the rule indicates that the computing node is not permitted to be rebooted, the computer system making a decision to not reboot the computing node and requesting user feedback about the decision to not reboot the computing node.

In another embodiment, the present invention provides a computer system including a central processing unit (CPU); a memory coupled to the CPU; and a computer readable storage device coupled to the CPU. The storage device includes instructions that are executed by the CPU via the memory to implement a method of determining a reboot time of a computing node in a network of computing nodes. The method includes the computer system collecting data specifying intra-box factors, inter-box factors, and user behaviors associated with the computing nodes in the network. The method further includes the computer system classifying the collected data in groups of metrics. The method further includes based on the classified data and user feedback, the computer system generating rules corresponding to the groups. Each rule includes an indicator of whether the corresponding group is associated with permitting a reboot or not permitting the reboot. The method further includes the computer system receiving data associated with the computing node in the network. The received data includes: data specifying intra-box factors and inter-box factors of the computing node and user behaviors that include operations of the computing node initiated by a user. The method further includes the computer system determining that the data associated with the computing node matches a group included in the groups of metrics. The method further includes based on the data associated with the computing node matching the group, the computer system determining that a rule corresponding to the group includes an indicator that indicates whether the computing node is permitted to be rebooted. The method further includes if the indicator in the rule indicates that the computing node is permitted to be rebooted, the computer system automatically rebooting the computing node, or if the indicator in the rule indicates that the computing node is not permitted to be rebooted, the computer system making a decision to not reboot the computing node and requesting user feedback about the decision to not reboot the computing node.

Embodiments of the present invention cognitively determine a time of a reboot of a guest OS (VM) in a cloud with a high confidence level and a high success rate, thereby allowing a cloud administrator to more easily maintain a complex cloud environment and providing a better experience for cloud users by reducing negative effects to application runtime and/or data integrity. Embodiments of the present invention determine whether to permit a reboot of a cloud node quickly and in a flexible manner.

DETAILED DESCRIPTION

Overview

Embodiments of the present invention determines a time at which a reboot of cloud nodes is permitted or not permitted by using machine learning and based on a cognitive method to analyze, model, train, monitor, and collect data of intra-box and inter-box factors and user behaviors. In one embodiment, a reboot time is determined for a cluster environment in order to improve the operation of a cloud data center. Embodiments of the present invention define reboot policy groups including metrics, weights, and rule logic based on monitoring data that specifies intra-box factors, inter-box factors, and user behaviors. Reboot policies may be continuously tuned based on continuous learning and artificially corrected based on the intra-box and inter-box factors. An ability to reboot a cloud node may be determined based on the reboot policies.

Cloud security is an important part of cloud computing environments. Traditional security work includes cloud administrators manually analyzing cloud host/VM patching and reboot timing, which makes some human errors or mistakes unavoidable. Embodiments of the present invention intelligently analyzes and determines the right time for rebooting a cloud node, and dynamically generates and enriches rules to refine reboot timing policies.

System for Determining a Reboot Time of a Computing Node

Figure 1:
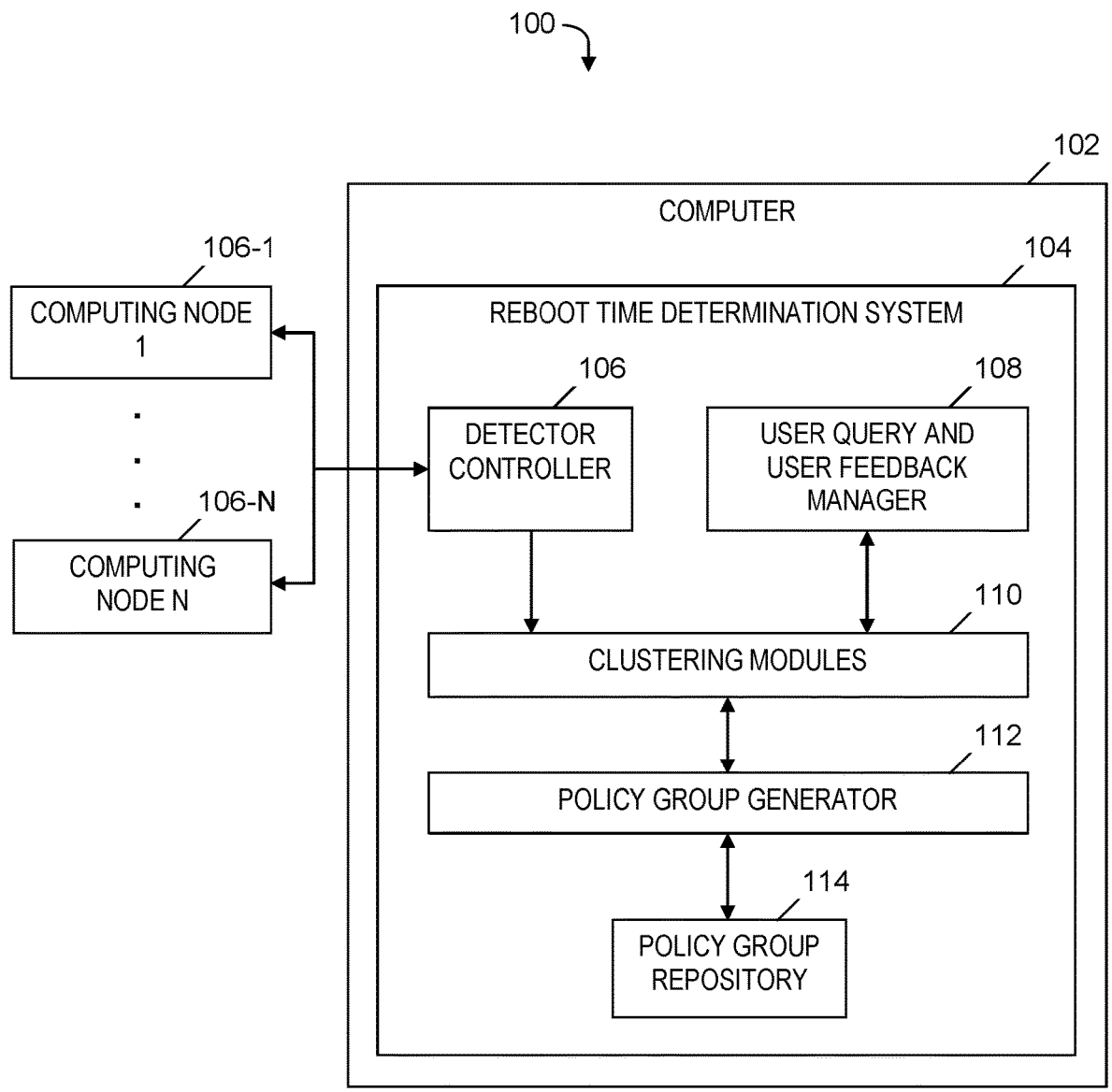
FIG. 1 is a block diagram of a system for determining a reboot time of a computing node, in accordance with embodiments of the present invention.

FIG. 1 is a block diagram of a system 100 for determining a reboot time of a computing node, in accordance with embodiments of the present invention. System 100 includes a computer 102 which executes a software-based reboot time determination system 104 which determines reboot times for each of computing node 106-1, . . . , computing node 106-N, where N is an integer greater than one. Computing nodes 106-1, . . . , 106-N are communicating with each other in a network (not shown). In one embodiment, computing nodes 106-1, . . . , 106-N are cloud computing nodes in a cloud computing environment.

Reboot time determination system 104 includes the following software: a detector controller 106, a user query and user feedback manager 108, clustering modules 110, and a policy group generator 112. Detector controller 106 sends detectors (i.e., software agents or plug-ins) to computing nodes 106-1, . . . , 106-N for monitoring or for log collection and analysis. The monitoring and log collection provided by the detectors collect data about intra-box factors, inter-box factors, and user behaviors associated with each of computing nodes 106-1, . . . , 106-N. In one embodiment, the detectors also pull data from cloud management platforms. Detector controller 106 sends the monitored and collected data to clustering modules 110.

User query and user feedback manager 108 sends queries to end users and collects user feedback about determinations of reboot times of computing nodes 106-1, . . . , 106-N. User query and user feedback manager 108 sends a rule based query to clustering modules 110 which make the decisions about whether to permit or not permit a reboot of a computing node. User query and user feedback manager 108 receives from clustering modules 110 confidence scores indicating levels of confidence in indications to permit rebooting or not permit rebooting, where each indication is included in a corresponding rule that associates data about intra-box and inter-box factors and user behaviors with a decision to permit rebooting or not permit rebooting of a computing node. User query and user feedback manager 108 sends to clustering modules 110 adjustments to rules and clusters based on the collected user feedback about whether decisions to permit rebooting or not permit rebooting of computing nodes are correct.

Policy group generator 112 performs machine learning using the intra-box and intra-box data and the data about user behaviors, where the machine learning is the basis for making the decision about the reboot times of computing nodes 106-1, . . . , 106-N. Policy group generator 112 generates policy groups, where each policy group may have multiple dimensions which specify values from the different metric categories of intra. For example, a policy group may specify one or more intra-box factors, one or more inter-box factors, and one or more user behaviors. Policy group generator 112 stores the generated policy groups in a policy group repository 114.

The functionality of the components shown in FIG. 1 is described in more detail in the discussion of FIG. 2, FIGS. 3A-3B, FIG. 4, and FIG. 5 presented below.

Figure 2:
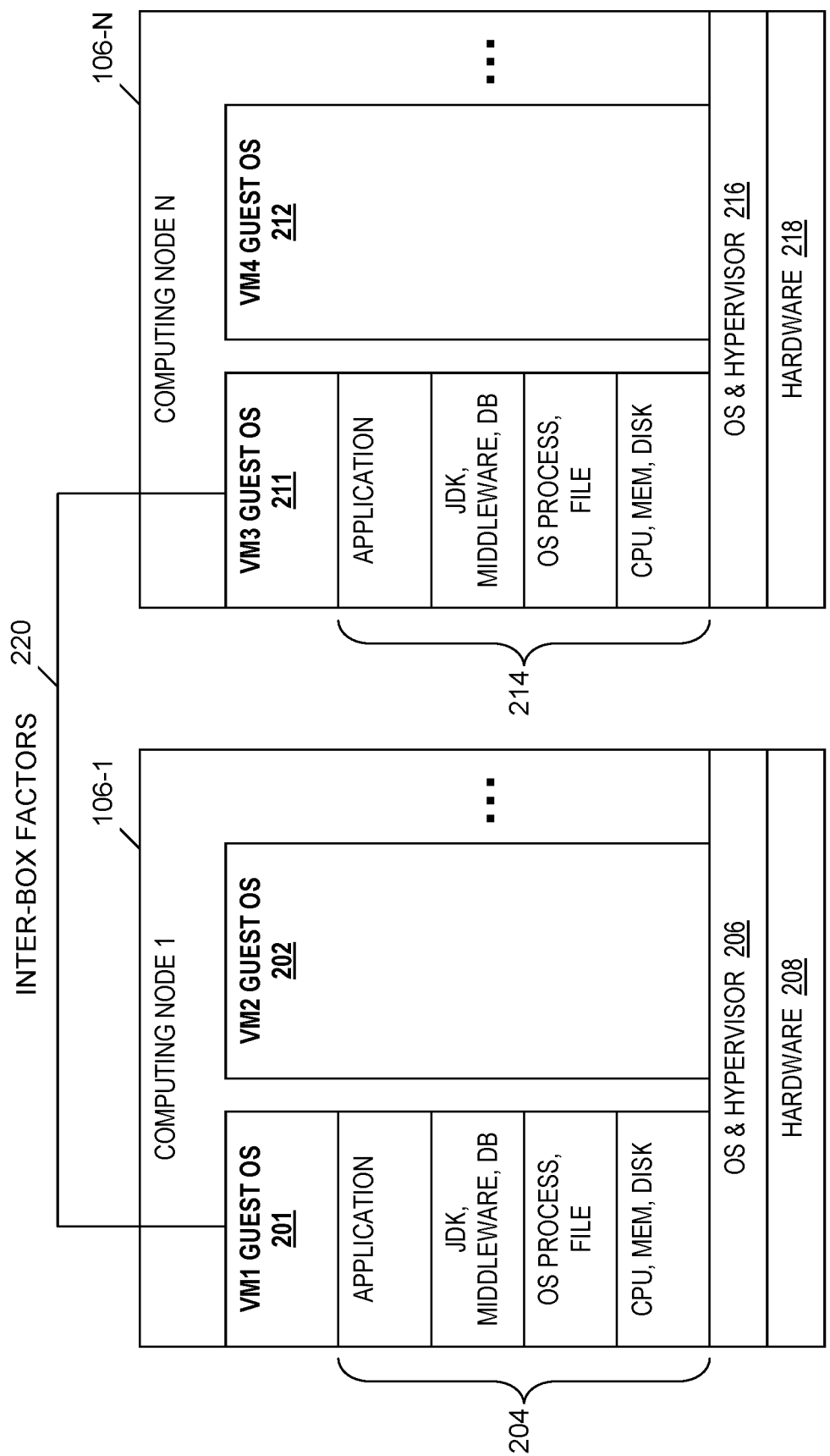
FIG. 2 is a block diagram of computing nodes for which reboot times are determined in the system of FIG. 1, in accordance with embodiments of the present invention.

FIG. 2 is a block diagram of computing nodes for which reboot times are determined in the system of FIG. 1, in accordance with embodiments of the present invention. Computing node 106-1 includes VM1 Guest OS 201, VM2 Guest OS 202, intra-box factors 204, OS & hypervisor 206, and hardware 208. VM1 Guest OS 201 and VM2 Guest OS 202 include first and second guest operating systems included in a virtual operating system (not shown) which executes on hardware 208, which includes a processor (not shown) and a memory (not shown). The first and second guest operating systems host first and second virtual machines (i.e., VM1 and VM2), respectively. The hypervisor in OS & hypervisor 206 is a common base portion that may be implemented in microcode running on a processor in hardware 208, or it may be implemented in software as part of the aforementioned virtual operating system, where the software may be loaded into a memory in hardware 208 for execution by a processor in hardware 208.

Computing node 106-N includes VM3 Guest OS 211, VM4 Guest OS 212, intra-box factors 214, OS & hypervisor 216, and hardware 218. VM3 Guest OS 211 and VM4 Guest OS 212 include first and second guest operating systems included in a virtual operating system (not shown) which executes on hardware 218, which includes a processor (not shown) and a memory (not shown). The first and second guest operating systems host first and second virtual machines (i.e., VM3 and VM4), respectively. The hypervisor in OS & hypervisor 216 is a common base portion that may be implemented in microcode running on a processor in hardware 218, or it may be implemented in software as part of the aforementioned virtual operating system, where the software may be loaded into memory in hardware 218 for execution by the processor in hardware 218.

Detector controller 106 (see FIG. 1) collects data about intra-box factors 204 and 214, which include:

(1) Utilization of a central processing unit (CPU), memory (MEM), disk, and input/output of disk, as collected from continuous monitoring data;

(2) State (in state duration) of OS processes and files, as collected from monitoring data and log information. The state may be alive (i.e., open) and dead (i.e., close).

(3) State (in state duration) of middleware and database, as collected from monitoring data and log information. The state may be active or inactive.

(4) State (in state duration) of application, as collected from monitoring data and log information. The state may be active or inactive.

(5) Security guideline: a time limit for patch severity and installation time. The guideline is input from security compliance guidelines or regulations.

Detector controller 106 (see FIG. 1) collects data about inter-box factors 220 from monitoring data and log information and analysis, and include:

(1) Configuration similarity: indicates whether computing nodes/guest VM configurations are similar. For example, if a guest VM on a first cloud node is provisioned as a web server host, and a web container is installed and configured with an application. Another guest VM on a second cloud node is provisioned in the same way. Furthermore, both of the guest VMs are load balance nodes serving as service end points. In this example, the two cloud nodes are designated as 100% similar, and therefore the indicators for reboot time are the same for both nodes.

(2) Connectivity topology: indicates the relationships and dependencies between computing nodes. For example, for a web server node that is connected to a database node, reboot time determination system 104 (see FIG. 1) obtains information about the relationship between the web server node and the database node via a cloud management platform or a monitoring mechanism. The connectivity topology determines a rebooting sequence of the computing nodes. For example, the web server node is rebooted before the database node to avoid an unprocessed transaction issue. As another example, for high availability (HA) nodes, rebooting time is defined for all of the HA nodes to avoid a non-available resource during service maintenance.

Although not shown in FIG. 2, detector controller 106 (see FIG. 1) collects monitoring data and log information to obtain data about user operations (i.e., user behaviors) performed on computing node 106-1 and computing node 106-N. The user operations may include logout, shell execution, or edit file. User operations provide a state of user action at a specific point in time or during a specific span of time. For example, if a user is usually inactive from 19:00 on one day to 8:00 the next day, reboot time determination system 104 (see FIG. 1) designates the user as being in "logout" status. During a logout status, reboot time determination system 104 may reboot the user's VM or OS without impact to the user's business. Further, if a user usually opts to perform shell programming and execution from 9:00 to 13:00, reboot time determination system 104 (see FIG. 1) designates the user as being in "shell execution" status, during which reboot time determination system 104 (see FIG. 1) is not permitted reboot the user's VM or OS because the user needs the OS to be active.

Process for Determining a Reboot Time of a Computing Node

Figure 3A:
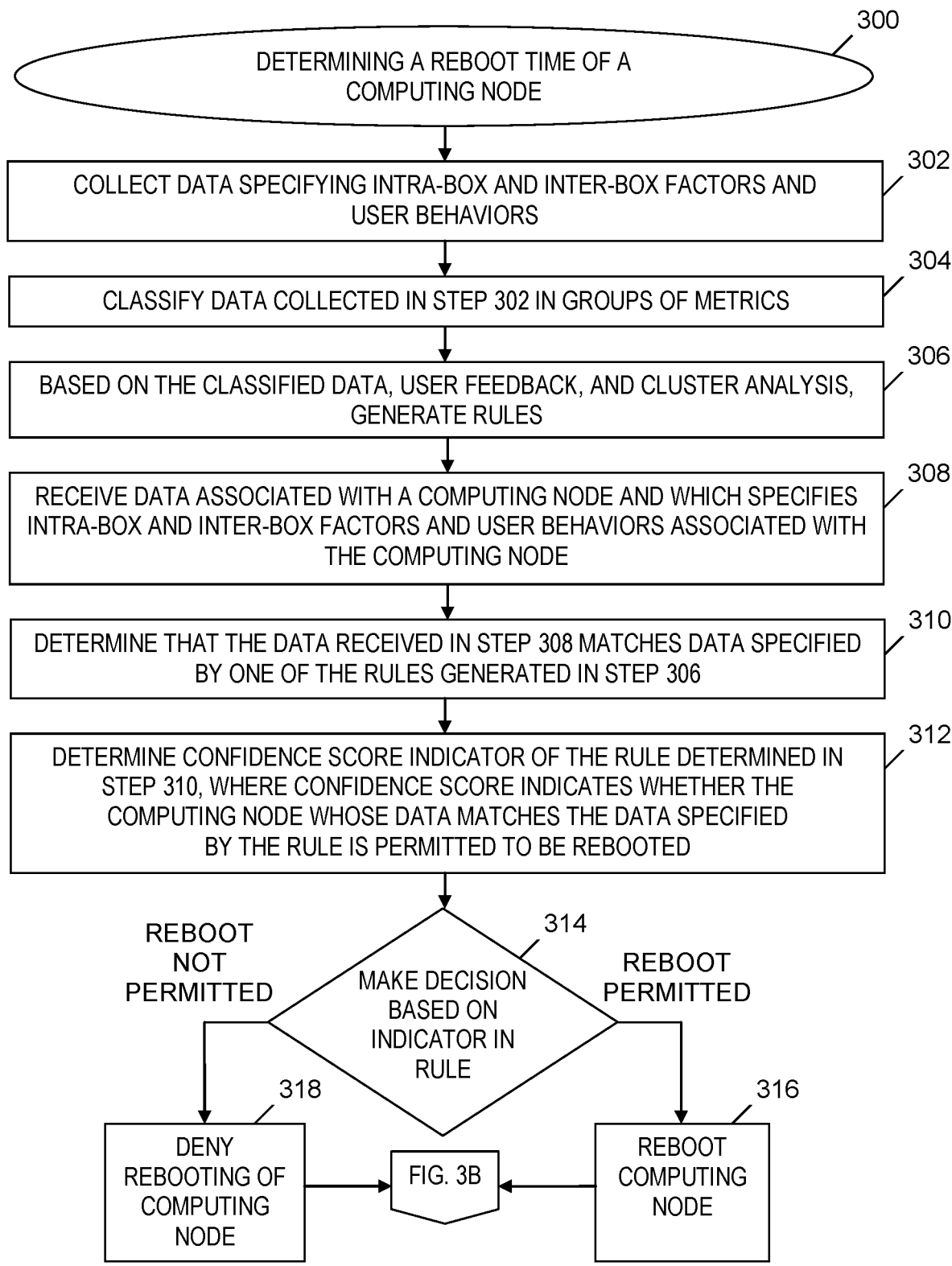
FIGS. 3A-3B depict a flowchart of a process of determining a reboot time of a computing node, in accordance with embodiments of the present invention.
Figure 3B:
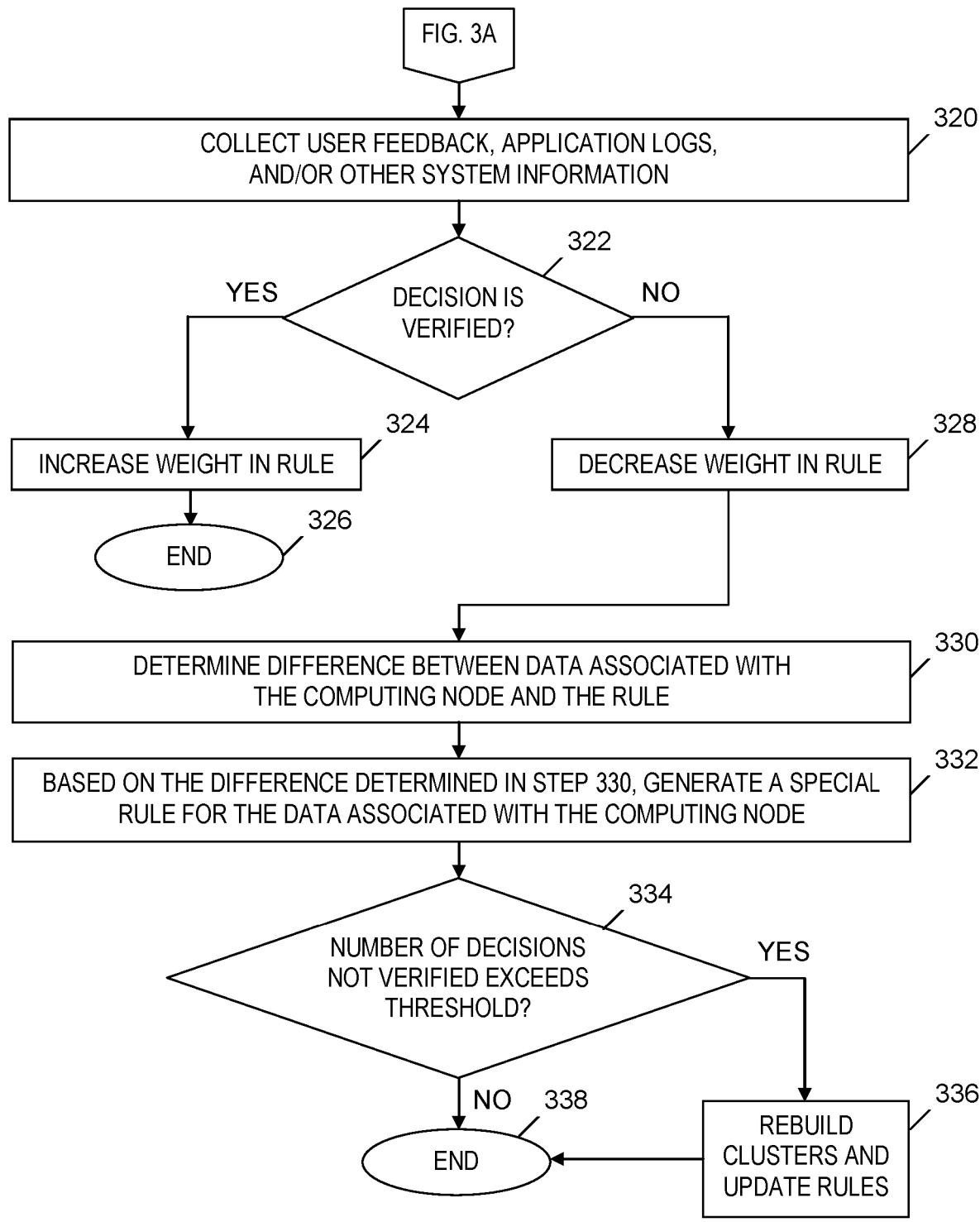

FIGS. 3A-3B depict a flowchart of a process of determining a reboot time of a computing node, in accordance with embodiments of the present invention. The process of FIGS. 3A-3B starts at step 300 in FIG. 3A. In step 302, reboot time determination system 104 (see FIG. 1) collects data specifying metrics in three categories: intra-box factors, inter-box factors, and user behaviors associated with computing nodes 106-1, . . . , 106-N (see FIG. 1).

In step 304, reboot time determination system 104 (see FIG. 1) classifies the data collected in step 302 in groups of metrics. Each category has one or more metrics. For example, the intra-box system category includes CPU and Disk information. The number of metrics in each category is not fixed. For instance, since each of multiple applications is a metric, the number of application metrics can be increased. The metrics in a category are vectors in multiple variable dimensions, including an indicator that indicates "permit reboot" or "reboot is not permitted." Step 304 also includes reboot time determination system 104 (see FIG. 1) defining the factors collected in step 302. In subsequent steps described below, the definitions of the factors and the classification of the data in step 304 are used as input to analysis that determines a reboot time of a computing node.

In one embodiment, reboot time determination system 104 (see FIG. 1) applies discretization analysis to convert continuous values into discrete values for at least some of the data collected in step 302. For example, reboot time determination system 104 (see FIG. 1) normalizes values into [0,N], which includes converting a boolean value into 0 or N.

To avoid data sparsity, reboot time determination system 104 (see FIG. 1) considers some vectors that have matching characteristics and may combine these vectors into one vector in step 304, even though the vectors had been recording different metrics in a database. The vectors may be combined, for example, by applying the A-priori method. Matching characteristics may be determined for vectors for Application 1 and Application 2, because Applications 1 and 2 have similar influences.

Because some of the vectors resulting from steps 302 and 304 have the "permit rebooting" property while other vectors have the "rebooting is not permitted" property, the entire set of vectors may be classified into two types. In one embodiment, since the processed metric data can be seen as points in multi-dimension space, reboot time determination system 104 (see FIG. 1) classifies the points as "permit rebooting" or "rebooting is not permitted." By using cluster analysis (e.g., K-means, decision tree, etc.), reboot time determination system 104 (see FIG. 1) puts the points into multiple clusters. Points within the same cluster have the same property (i.e., either "permit rebooting" or "rebooting is not permitted").

In step 306, based on the data classified in step 304, user feedback, and cluster analysis, reboot time determination system 104 (see FIG. 1) dynamically generates classification groups and rules associated with the classification groups. The rules associate inter-box factors, inter-box factors, and user behaviors of the computing nodes 106-1, . . . , 106-N (see FIG. 1) with indications of whether a reboot of the respective computing nodes is permitted or not permitted. After 306 and prior to step 308, reboot time determination system 104 (see FIG. 1) retrieves user decisions as initial indicators for the generated classification groups, where each indicator indicates whether a computing node in the corresponding classification group is permitted to be rebooted or not permitted to be rebooted.

In one embodiment, a user initially defines some of the classification groups as group seeds. For example, the user may initially define "CPU=High=>rebooting is not permitted" and "CPU=Low, nighttime=>permit rebooting" as group seeds. Over time, as more data is collected in subsequent performances of step 302, reboot time determination system 104 (see FIG. 1) generates more children groups by splitting the original groups based on their rebooting results. Reboot time determination system 104 (see FIG. 1) may determine that a group generated by previous data may not be appropriate for newly collected data because the newly collected data needs to be associated with a different rebooting decision. The splitting of groups into new children groups provides a continuous learning and tuning of the classification groups, thereby improving the aforementioned machine learning itself. In one embodiment, the continuous learning and tuning method may be replicated in multiple cloud computing environments.

For example, an initial group is defined by the user as "CPU=High=>rebooting is not permitted." Using newly collected data, reboot time determination system 104 (see FIG. 1) determines that the initial group must be updated by splitting it into children groups because the new data indicates that there are conditions under which CPU can be High and rebooting should be permitted. Using the newly collected data, reboot time determination system 104 (see FIG. 1) determines that under a condition of CPU=High, if App X is running, then rebooting is permitted, if App Y is running, then rebooting is not permitted, and if apps other than App X and Y are running, then (i) rebooting is permitted if the current time is nighttime and (ii) rebooting is not permitted if the current time is daytime. Reboot time determination system 104 (see FIG. 1) generates children groups under "CPU=High" to include a first child group "App X running" which indicates that a reboot is permitted, a second child group "App Y running" which indicates that a reboot is not permitted, and a third child group "Others" (i.e., an app other than App X and App Y is running). The "Others" group has its own two children groups "nighttime" which indicates that a reboot is permitted and "daytime" which indicates that a reboot is not permitted.

In step 308, reboot time determination system 104 (see FIG. 1) receives data in a vector, where the data is associated with a computing node included in computing nodes 106-1, . . . , 106-N. The data received in step 308 specifies intra-box and inter-box factors and user behaviors associated with the computing node.

In step 310, reboot time determination system 104 (see FIG. 1) searches the rules generated in step 306 and identifies one of the rules as being a rule that specifies data matching the data received in step 308.

In step 312, for the rule identified in step 310, reboot time determination system 104 (see FIG. 1) determines the confidence score, which is an indicator for the decisions of permitting rebooting and for rebooting is not permitted. The confidence score indicates whether the computing node whose data matches the data specified by the rule is permitted to be rebooted.

In step 314, reboot time determination system 104 (see FIG. 1) makes a decision based on the indication of the confidence scores. If reboot time determination system 104 (see FIG. 1) makes a decision that a reboot of the computing node is permitted, then in step 316, reboot time determination system 104 (see FIG. 1) automatically reboots the computing node. If reboot time determination system 104 (see FIG. 1) makes a decision in step 314 that the reboot of the computing node is not permitted, then in step 318, reboot time determination system 104 (see FIG. 1) denies the rebooting of the computing node. Hereinafter in the discussion of FIGS. 3*a*-3B, the decision made in step 314 is referred to simply as "the decision."

Following step 316 and step 318, the process of FIGS. 3A-3B continues with step 320 in FIG. 3B.

In step 320, reboot time determination system 104 (see FIG. 1) collects user feedback, application logs, and other system information about the decision.

In step 322, based on the user feedback, application logs, and other system information collected in step 320, reboot time determination system 104 (see FIG. 1) determines whether the decision made in step 314 (see FIG. 3A) is verified. If reboot time determination system 104 (see FIG. 1) verifies the decision, then the Yes branch of step 322 is taken and step 324 is performed. In step 324, reboot time determination system 104 (see FIG. 1) increases a weight in the rule which indicates the likelihood that the indication of permitting or not permitting the reboot is accurate. Following step 324, the process of FIGS. 3A-3B ends at step 326. As used herein, a weight in a rule denotes a confidence score of the rule. As a cluster increases the number of vectors it contains, the weight in the corresponding rule increases.

Returning to step 322, if reboot time determination system 104 (see FIG. 1) determines that the decision is not verified, then the No branch of step 322 is taken and step 328 is performed. In step 328, reboot time determination system 104 (see FIG. 1) decreases the aforementioned weight in the rule.

In step 330, reboot time determination system 104 (see FIG. 1) determines a difference between the data associated with the computing node and data specified by the rule.

In step 332, based on the difference determined in step 330, reboot time determination system 104 (see FIG. 1) generates a special new rule for the data associated with the computing node.

In step 334, reboot time determination system 104 (see FIG. 1) determines whether the number of decisions that are not verified in step 322 exceeds a predefined threshold value (i.e., the number of times the No branch in step 322 is followed in multiple performances of the process of FIGS. 3A-3B exceeds a predefined threshold value). If the number of decisions that are not verified exceeds the threshold, then the Yes branch of step 334 is taken and step 336 is performed. In step 336, reboot time determination system 104 (see FIG. 1) rebuilds the clusters that had provided the classification groups and updates the rules according to the rebuilt clusters. After step 336, the process of FIGS. 3A-3B ends at step 338.

Returning to step 334, if the number of decisions that are not verified does not exceed the threshold, then the process of FIGS. 3A-3B ends at step 338.

EXAMPLE

Figure 4:
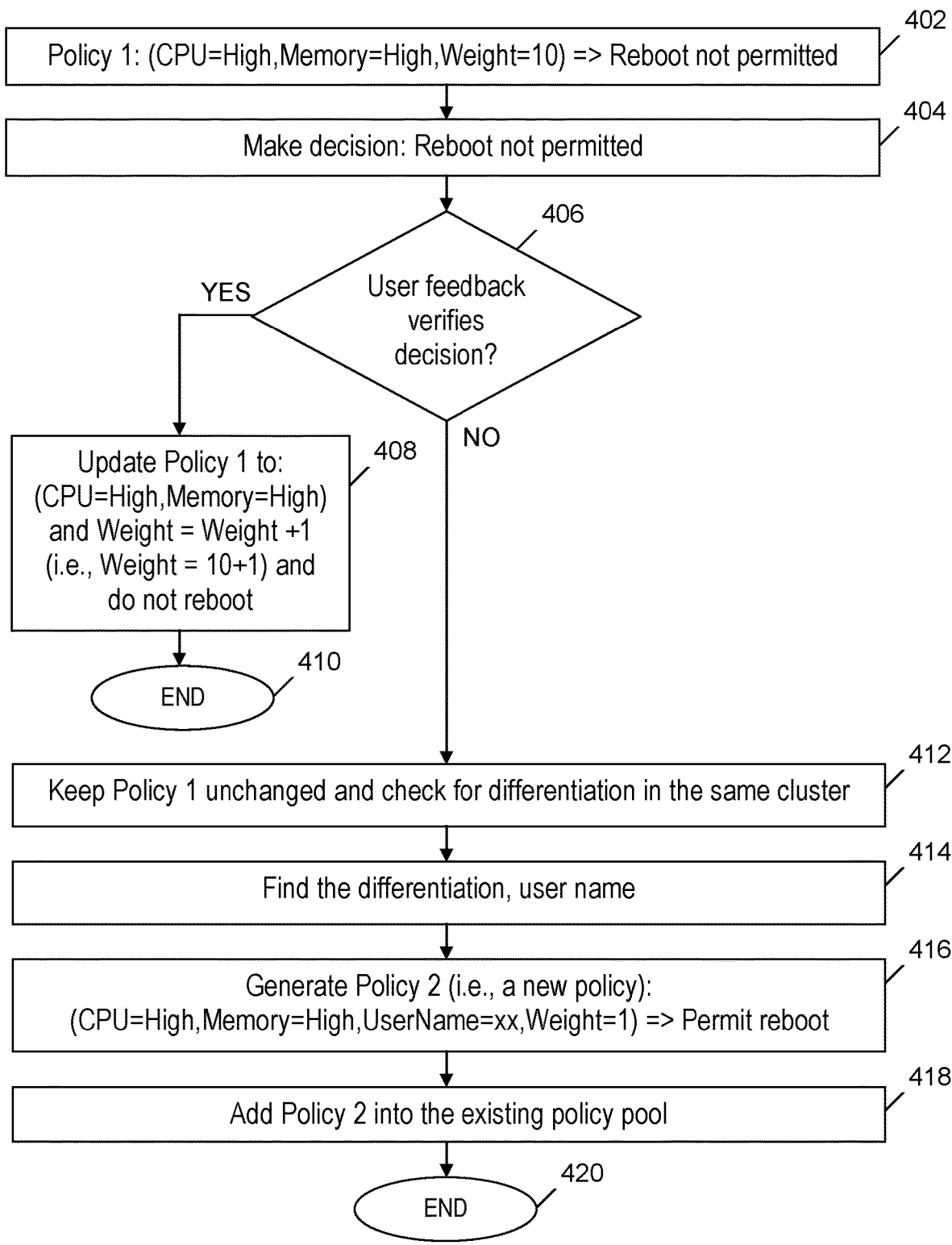
FIG. 4 is an example of determining a reboot time in the process of FIGS. 3A-3B, in accordance with embodiments of the present invention.

FIG. 4 is an example of determining a reboot time in the process of FIGS. 3A-3B, in accordance with embodiments of the present invention. In step 402, reboot time determination system 104 (see FIG. 1) determines that data about computing node 106-1 (see FIG. 1), which includes intra-box and inter-box factors and user behaviors, matches the indicator values in Policy 1. Policy 1 is a rule indicating that when CPU utilization is high and memory utilization is high for a computing node associated with Policy 1, a reboot of the computing node is not permitted. Policy 1 assigns a weight=10 for the decision to not permit the reboot under the indications in the rule.

In step 404, makes the decision to not permit the reboot of computing node 106-1 (see FIG. 1).

After step 404 and prior to step 406, reboot time determination system 104 (see FIG. 1) collects user feedback which indicates whether the decision made in step 404 is correct or not correct. In step 406, reboot time determination system 104 (see FIG. 1) determines whether the user feedback verifies the decision made in step 404. If the user feedback verifies the decision made in step 404, then the Yes branch of step 406 is taken and step 408 is performed. In step 408, reboot time determination system 104 (see FIG. 1) updates Policy 1 to increment the weight by one (i.e., the updated weight is 10+1 or 11). In the updated Policy 1, the indicators for CPU and Memory remain set to "High." Following step 408, the process of FIG. 4 ends at step 410.

Returning to step 406, if the user feedback does not verify the decision made in step 404, then the No branch of step 406 is taken and step 412 is performed.

In step 412, reboot time determination system 104 (see FIG. 1) keeps Policy 1 unchanged and checks for a differentiation between inter-box factor, intra-box factor, and user behavior data associated with computing node 106-1 (see FIG. 1) and data specified by the cluster that includes Policy 1.

In step 414, reboot time determination system 104 (see FIG. 1) finds the aforementioned differentiation and user name.

In step 416, reboot time determination system 104 (see FIG. 1) generates Policy 2 (i.e., a new policy) which indicates that when CPU utilization is high, memory utilization is high and the UserName=xx, then a computing node associated with Policy 2 is permitted to be rebooted. Reboot time determination system 104 (see FIG. 1) assigns a weight of 1 as an initial weight of the new policy and its indication that the associated computing node is permitted to be rebooted.

In step 418, reboot time determination system 104 (see FIG. 1) adds Policy 2 into the existing pool of policies. After step 418, the process of FIG. 4 ends at step 420.

Computer System

Figure 5:
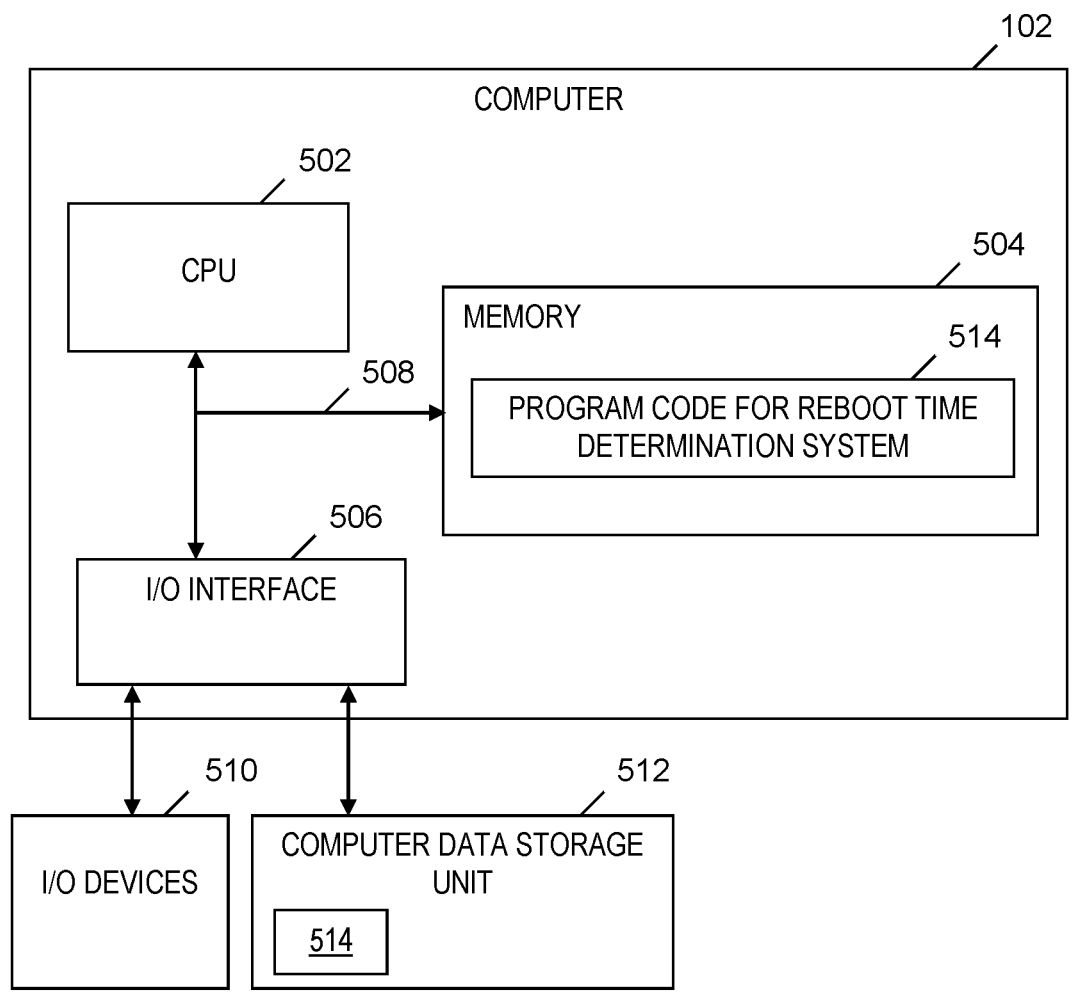
FIG. 5 is a block diagram of a computer that is included in the system of FIG. 1 and that implements the process of FIGS. 3A-3B, in accordance with embodiments of the present invention.

FIG. 5 is a block diagram of a computer that is included in the system of FIG. 1 and that implements the process of FIGS. 3A-3B, in accordance with embodiments of the present invention. Computer 102 is a computer system that generally includes a central processing unit (CPU) 502, a memory 504, an input/output (I/O) interface 506, and a bus 508. Further, computer 102 is coupled to I/O devices 510 and a computer data storage unit 512. CPU 502 performs computation and control functions of computer 102, including executing instructions included in program code 514 for reboot time determination system 104 (see FIG. 1) to perform a method of determining a reboot time of a computing node in a network of computing nodes, where the instructions are executed by CPU 502 via memory 504. CPU 502 may include a single processing unit, or be distributed across one or more processing units in one or more locations (e.g., on a client and server).

Memory 504 includes a known computer readable storage medium, which is described below. In one embodiment, cache memory elements of memory 504 provide temporary storage of at least some program code (e.g., program code 514) in order to reduce the number of times code must be retrieved from bulk storage while instructions of the program code are executed. Moreover, similar to CPU 502, memory 504 may reside at a single physical location, including one or more types of data storage, or be distributed across a plurality of physical systems in various forms. Further, memory 504 can include data distributed across, for example, a local area network (LAN) or a wide area network (WAN).

I/O interface 506 includes any system for exchanging information to or from an external source. I/O devices 510 include any known type of external device, including a display, keyboard, etc. Bus 508 provides a communication link between each of the components in computer 102, and may include any type of transmission link, including electrical, optical, wireless, etc.

I/O interface 506 also allows computer 102 to store information (e.g., data or program instructions such as program code 514) on and retrieve the information from computer data storage unit 512 or another computer data storage unit (not shown). Computer data storage unit 512 includes a known computer readable storage medium, which is described below. In one embodiment, computer data storage unit 512 is a non-volatile data storage device, such as a magnetic disk drive (i.e., hard disk drive) or an optical disc drive (e.g., a CD-ROM drive which receives a CD-ROM disk).

Memory 504 and/or storage unit 512 may store computer program code 514 that includes instructions that are executed by CPU 502 via memory 504 to determine a reboot time of a computing node in a network of computing nodes. Although FIG. 5 depicts memory 504 as including program code, the present invention contemplates embodiments in which memory 504 does not include all of code 514 simultaneously, but instead at one time includes only a portion of code 514.

Further, memory 504 may include an operating system (not shown) and may include other systems not shown in FIG. 5.

Storage unit 512 and/or one or more other computer data storage units (not shown) that are coupled to computer 102 may include policy groups generated by policy group generator 112 (see FIG. 1). In one embodiment, policy group repository 114 (see FIG. 1) is included in storage unit 512.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to determining a reboot time of a computing node in a network of computing nodes. Thus, an embodiment of the present invention discloses a process for supporting computer infrastructure, where the process includes providing at least one support service for at least one of integrating, hosting, maintaining and deploying computer readable code (e.g., program code 514) in a computer system (e.g., computer 102) including one or more processors (e.g., CPU 502), wherein the processor(s) carry out instructions contained in the code causing the computer system to determine a reboot time of a computing node in a network of computing nodes. Another embodiment discloses a process for supporting computer infrastructure, where the process includes integrating computer readable program code into a computer system including a processor. The step of integrating includes storing the program code in a computer readable storage device of the computer system through use of the processor. The program code, upon being executed by the processor, implements a method of determining a reboot time of a computing node in a network of computing nodes.

While it is understood that program code 514 for determining a reboot time of a computing node in a network of computing nodes may be deployed by manually loading directly in client, server and proxy computers (not shown) via loading a computer readable storage medium (e.g., computer data storage unit 512), program code 514 may also be automatically or semi-automatically deployed into computer 102 by sending program code 514 to a central server or a group of central servers. Program code 514 is then downloaded into client computers (e.g., computer 102) that will execute program code 514. Alternatively, program code 514 is sent directly to the client computer via e-mail. Program code 514 is then either detached to a directory on the client computer or loaded into a directory on the client computer by a button on the e-mail that executes a program that detaches program code 514 into a directory. Another alternative is to send program code 514 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 514 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of determining a reboot time of a computing node in a network of computing nodes. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 504 and computer data storage unit 512) having computer readable program instructions 514 thereon for causing a processor (e.g., CPU 502) to carry out aspects of the present invention.

The computer readable storage medium can be a tangible device that can retain and store instructions (e.g., program code 514) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 514) described herein can be downloaded to respective computing/processing devices (e.g., computer 102) from a computer readable storage medium or to an external computer or external storage device (e.g., computer data storage unit 512) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 514) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIGS. 3A-3B) and/or block diagrams (e.g., FIG. 1 and FIG. 5) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 514).

These computer readable program instructions may be provided to a processor (e.g., CPU 502) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 512) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 514) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
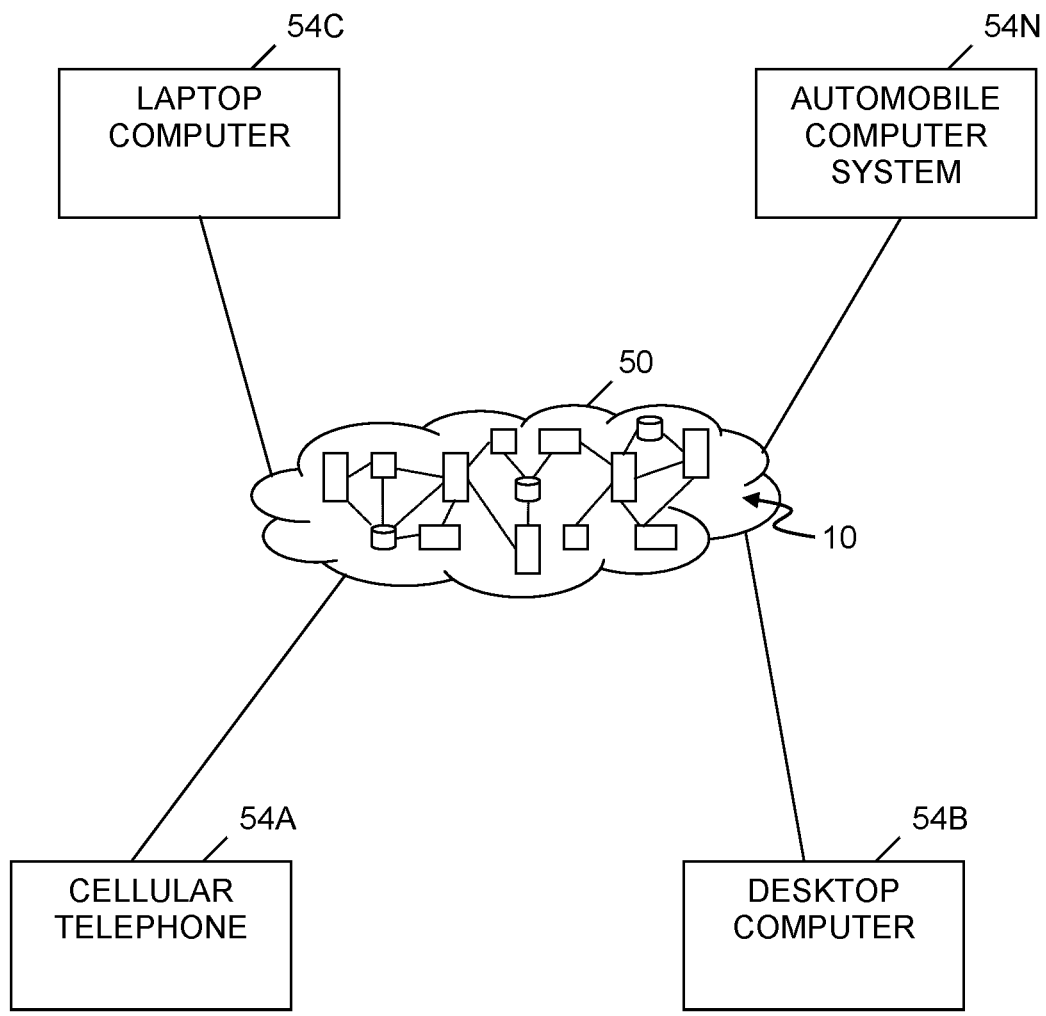
FIG. 6 depicts a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
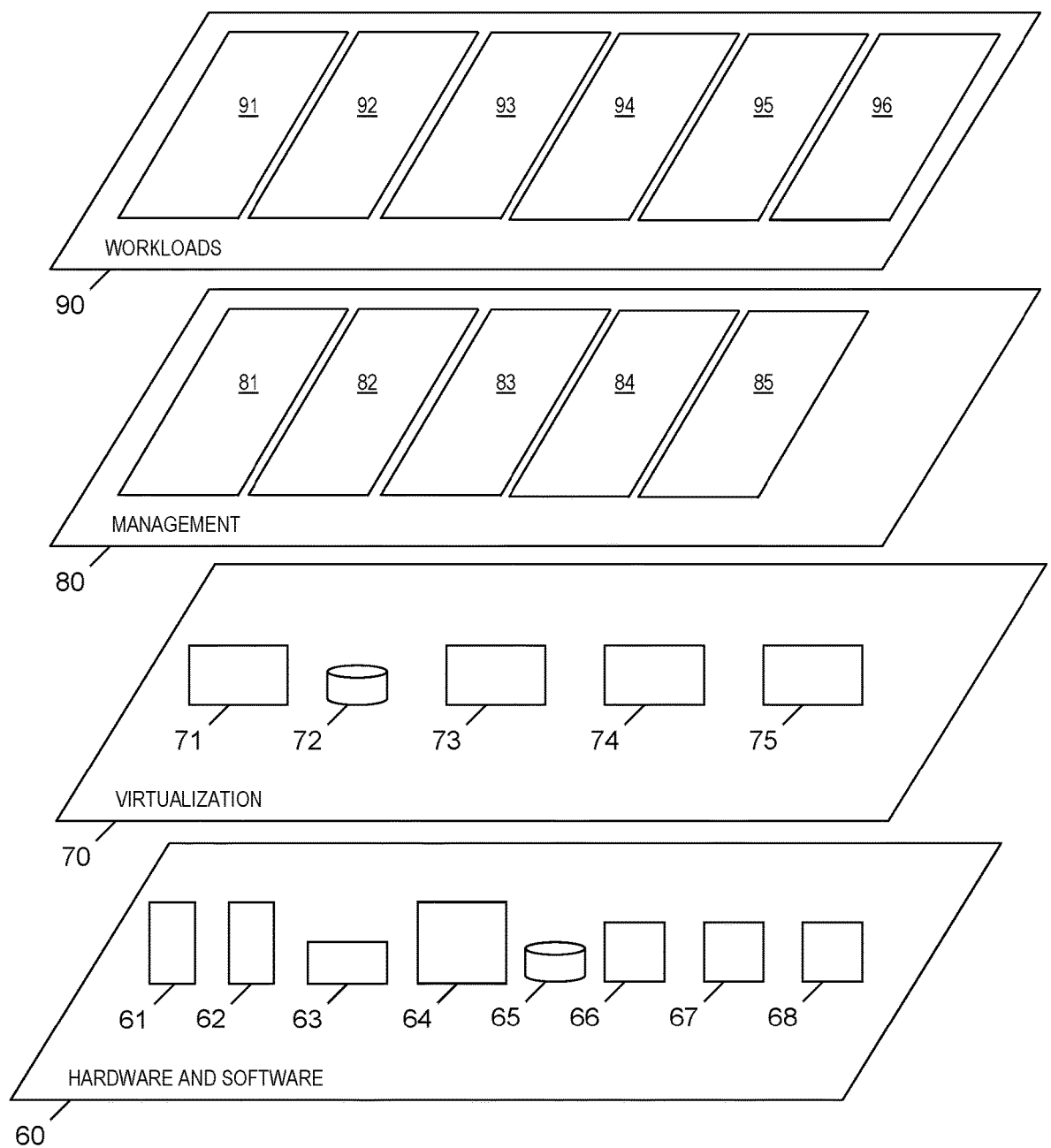
FIG. 7 depicts abstraction model layers, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and computing node reboot time determination 96.

What is claimed is:

1. A method of determining a reboot time of a computing node in a network of computing nodes, the method comprising the steps of:
   a computer collecting data specifying intra-box factors, inter-box factors, and user behaviors associated with the computing nodes in the network;
   the computer classifying the collected data in groups of metrics;
   based on the classified data and user feedback, the computer generating rules corresponding to the groups, each rule including an indicator of whether the corresponding group is associated with permitting a reboot or not permitting the reboot;
   the computer receiving data associated with the computing node in the network, the received data including: data specifying intra-box factors and inter-box factors of the computing node and user behaviors that include operations of the computing node initiated by a user;
   the computer determining that the data associated with the computing node matches a group included in the groups of metrics;
   based on the data associated with the computing node matching the group, the computer determining that a rule corresponding to the group includes an indicator that indicates whether the computing node is permitted to be rebooted; and if the indicator in the rule indicates that the computing node is permitted to be rebooted, the computer automatically rebooting the computing node, or if the indicator in the rule indicates that the computing node is not permitted to be rebooted, the computer making a decision to not reboot the computing node and requesting user feedback about the decision to not reboot the computing node.

2. The method of claim 1, further comprising the steps of:

the computer determining that the indicator in the rule indicates that the computing node is not permitted to be rebooted and in response, performing the steps of making the decision to not reboot the computing node and requesting the user feedback about the decision to not reboot the computing node;

the computer receiving the user feedback about the decision to not reboot the computing node;

based on the received user feedback, the computer determining whether the decision is correct or not correct; and if the decision is determined to be correct, the computer increasing a confidence score in the rule, the confidence score indicating that the computing node is not permitted to be rebooted, or if the decision is determined to be not correct, the computer determining a differentiation between the data associated with the computing node and data in a cluster associated with the rule, and based on the differentiation, the computer generating a new rule that includes a new indicator that indicates that a computing node associated with the new rule is permitted to be rebooted.

3. The method of claim 2, further comprising the steps of:

the computer receiving other data associated with another computing node in the network, the received other data matching the data associated with the computing node;

based on the other data associated with the other computing node matching the data associated with the computing node, the computer determining that that new rule applies to the other computing node and that the new indicator in the new rule applies to the other computing node; and based on the new indicator being applied to the other computing node and the new indicator indicating that the other computing node is permitted to be rebooted, the computer automatically rebooting the other computing node.

4. The method of claim 3, further comprising the step of the computer assigning a new confidence score to the new rule, the new confidence score being lower than the confidence score indicating that the computing node is not permitted to be rebooted.

5. The method of claim 1, wherein the computing nodes are nodes in a cloud computing environment.

6. The method of claim 1, further comprising the step of based on the collected data specifying the intra-box factors, inter-box factors, and user behavior, the computer determining weights assigned to the rules, respectively, the weights indicating respective amounts of confidence that values of the indicators included in the rules are correct.

7. The method of claim 1, further comprising the step of the computer continuously tuning the rules based on continuous learning about the intra-box factors, the inter-box factors, and the user behavior.

8. The method of claim 1, further comprising the step of:

providing at least one support service for at least one of creating, integrating, hosting, maintaining, and deploying computer readable program code in the computer, the program code being executed by a processor of the computer to implement the steps of collecting the data specifying the intra-box factors, the inter-box factors, and the user behaviors, classifying the collected data, receiving the data associated with the computing node, determining that the data associated with the computing node matches the group, determining that the rule includes the indicator, and if the indicator indicates that the computing node is permitted to be rebooted, automatically rebooting, or if the indicator indicates that that computing node is not permitted to be rebooted, making the decision to not reboot and requesting the user feedback.

9. A computer program product for determining a reboot time of a computing node in a network of computing nodes, the computer program product comprising a computer readable storage medium having computer readable program code stored on the computer readable storage medium, wherein the computer readable storage medium is not a transitory signal per se, the computer readable program code being executed by a central processing unit (CPU) of a computer system to cause the computer system to perform a method comprising the steps of:

the computer system collecting data specifying intra-box factors, inter-box factors, and user behaviors associated with the computing nodes in the network;

the computer system classifying the collected data in groups of metrics;

based on the classified data and user feedback, the computer system generating rules corresponding to the groups, each rule including an indicator of whether the corresponding group is associated with permitting a reboot or not permitting the reboot;

the computer system receiving data associated with the computing node in the network, the received data including: data specifying intra-box factors and inter-box factors of the computing node and user behaviors that include operations of the computing node initiated by a user;

the computer system determining that the data associated with the computing node matches a group included in the groups of metrics;

based on the data associated with the computing node matching the group, the computer system determining that a rule corresponding to the group includes an indicator that indicates whether the computing node is permitted to be rebooted; and if the indicator in the rule indicates that the computing node is permitted to be rebooted, the computer system automatically rebooting the computing node, or if the indicator in the rule indicates that the computing node is not permitted to be rebooted, the computer system making a decision to not reboot the computing node and requesting user feedback about the decision to not reboot the computing node.

10. The computer program product of claim 9, wherein the method further comprises the steps of:

the computer system determining that the indicator in the rule indicates that the computing node is not permitted to be rebooted and in response, performing the steps of making the decision to not reboot the computing node and requesting the user feedback about the decision to not reboot the computing node;

the computer system receiving the user feedback about the decision to not reboot the computing node;

based on the received user feedback, the computer system determining whether the decision is correct or not correct; and if the decision is determined to be correct, the computer system increasing a confidence score in the rule, the confidence score indicating that the computing node is not permitted to be rebooted, or if the decision is determined to be not correct, the computer system determining a differentiation between the data associated with the computing node and data in a cluster associated with the rule, and based on the differentiation, the computer system generating a new rule that includes a new indicator that indicates that a computing node associated with the new rule is permitted to be rebooted.

11. The computer program product of claim 10, wherein the method further comprises the steps of:

the computer system receiving other data associated with another computing node in the network, the received other data matching the data associated with the computing node;

based on the other data associated with the other computing node matching the data associated with the computing node, the computer system determining that that new rule applies to the other computing node and that the new indicator in the new rule applies to the other computing node; and based on the new indicator being applied to the other computing node and the new indicator indicating that the other computing node is permitted to be rebooted, the computer system automatically rebooting the other computing node.

12. The computer program product of claim 11, wherein the method further comprises the step of the computer system assigning a new confidence score to the new rule, the new confidence score being lower than the confidence score indicating that the computing node is not permitted to be rebooted.

13. The computer program product of claim 9, wherein the computing nodes are nodes in a cloud computing environment.

14. The computer program product of claim 9, wherein the method further comprises the step of based on the collected data specifying the intra-box factors, inter-box factors, and user behavior, the computer system determining weights assigned to the rules, respectively, the weights indicating respective amounts of confidence that values of the indicators included in the rules are correct.

15. A computer system comprising:

a central processing unit (CPU);

a memory coupled to the CPU; and a computer readable storage device coupled to the CPU, the computer readable storage device containing instructions that are executed by the CPU via the memory to implement a method of determining a reboot time of a computing node in a network of computing nodes, the method comprising the steps of:

the computer system collecting data specifying intra-box factors, inter-box factors, and user behaviors associated with the computing nodes in the network;

the computer system classifying the collected data in groups of metrics;

based on the classified data and user feedback, the computer system generating rules corresponding to the groups, each rule including an indicator of whether the corresponding group is associated with permitting a reboot or not permitting the reboot;

the computer system receiving data associated with the computing node in the network, the received data including: data specifying intra-box factors and inter-box factors of the computing node and user behaviors that include operations of the computing node initiated by a user;

the computer system determining that the data associated with the computing node matches a group included in the groups of metrics;

based on the data associated with the computing node matching the group, the computer system determining that a rule corresponding to the group includes an indicator that indicates whether the computing node is permitted to be rebooted; and if the indicator in the rule indicates that the computing node is permitted to be rebooted, the computer system automatically rebooting the computing node, or if the indicator in the rule indicates that the computing node is not permitted to be rebooted, the computer system making a decision to not reboot the computing node and requesting user feedback about the decision to not reboot the computing node.

16. The computer system of claim 15, wherein the method further comprises the steps of:

the computer system determining that the indicator in the rule indicates that the computing node is not permitted to be rebooted and in response, performing the steps of making the decision to not reboot the computing node and requesting the user feedback about the decision to not reboot the computing node;

the computer system receiving the user feedback about the decision to not reboot the computing node;

based on the received user feedback, the computer system determining whether the decision is correct or not correct; and if the decision is determined to be correct, the computer system increasing a confidence score in the rule, the confidence score indicating that the computing node is not permitted to be rebooted, or if the decision is determined to be not correct, the computer system determining a differentiation between the data associated with the computing node and data in a cluster associated with the rule, and based on the differentiation, the computer system generating a new rule that includes a new indicator that indicates that a computing node associated with the new rule is permitted to be rebooted.

17. The computer system of claim 16, wherein the method further comprises the steps of:

the computer system receiving other data associated with another computing node in the network, the received other data matching the data associated with the computing node;

based on the other data associated with the other computing node matching the data associated with the computing node, the computer system determining that that new rule applies to the other computing node and that the new indicator in the new rule applies to the other computing node; and based on the new indicator being applied to the other computing node and the new indicator indicating that the other computing node is permitted to be rebooted, the computer system automatically rebooting the other computing node.

18. The computer system of claim 17, wherein the method further comprises the step of the computer system assigning a new confidence score to the new rule, the new confidence score being lower than the confidence score indicating that the computing node is not permitted to be rebooted.

19. The computer system of claim 15, wherein the computing nodes are nodes in a cloud computing environment.

20. The computer system of claim 15, wherein the method further comprises the step of based on the collected data specifying the intra-box factors, inter-box factors, and user behavior, the computer system determining weights assigned to the rules, respectively, the weights indicating respective amounts of confidence that values of the indicators included in the rules are correct.

* * * * *